United States Patent
You et al.

(10) Patent No.: US 9,535,206 B2
(45) Date of Patent: Jan. 3, 2017

(54) DISPLAY WITH STRUCTURES FOR REDUCING BLUE EDGE EFFECTS

(71) Applicant: Apple Inc., Cupertino, CA (US)

(72) Inventors: Chenhua You, San Jose, CA (US); Jun Qi, Cupertino, CA (US); Sheng Min Wang, Hsinchu (TW); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 14/494,555

(22) Filed: Sep. 23, 2014

(65) Prior Publication Data
US 2015/0355399 A1    Dec. 10, 2015

Related U.S. Application Data

(60) Provisional application No. 62/009,504, filed on Jun. 9, 2014.

(51) Int. Cl.
*G02F 1/1335* (2006.01)
*F21V 8/00* (2006.01)

(52) U.S. Cl.
CPC ............ *G02B 6/005* (2013.01); *G02B 6/0055* (2013.01); *G02B 6/0068* (2013.01); *G02B 6/0073* (2013.01); *G02F 1/133512* (2013.01); *G02F 1/133615* (2013.01); *G02F 1/133617* (2013.01); *G02F 2001/133614* (2013.01); *G02F 2001/133624* (2013.01)

(58) Field of Classification Search
CPC ..... G02B 6/005; G02B 6/0055; G02B 6/0068; G02B 6/0073; G02F 1/133512; G02F 1/133615; G02F 1/133617
See application file for complete search history.

(56) References Cited

U.S. PATENT DOCUMENTS

| | | |
|---|---|---|
| 2013/0063496 A1 | 3/2013 | Basler et al. |
| 2014/0192294 A1 | 7/2014 | Chen et al. |
| 2014/0319995 A1* | 10/2014 | Kim .................. G02F 1/133512 313/501 |

FOREIGN PATENT DOCUMENTS

| | | |
|---|---|---|
| WO | WO2013/144964 A1 | 10/2013 |
| WO | WO2014/123836 A1 | 8/2014 |
| WO | WO2014/143713 A1 | 9/2014 |

* cited by examiner

*Primary Examiner* — James Dudek
(74) *Attorney, Agent, or Firm* — Treyz Law Group, P.C.; G. Victor Treyz; Zachary D. Hadd

(57) ABSTRACT

Display backlight structures may provide backlight illumination that passes through display layers in the display. Light-emitting diodes may emit blue light into an edge of a light guide plate. Optical films may overlap the light guide plate. The optical films may include a quantum dot enhancement film. A peripheral strip of yellow reflector or other light control structures may be incorporated into the backlight structures to reduce blue edge effects. The light control structures may have features with a spatially varying density, may be formed from quantum dot enhancement film, or may be formed form other structures. The light control structures may be formed on the surfaces of the optical films, on a reflective layer under the light guide plate, or on a surface of a mold frame or other structure that lies in a plane parallel to the plane of the light guide plate.

19 Claims, 15 Drawing Sheets

DISPLAY WITH STRUCTURES FOR REDUCING BLUE EDGE EFFECTS

This application claims the benefit of provisional patent application No. 62/009,504, filed Jun. 9, 2014, which is hereby incorporated by reference herein in its entirety.

BACKGROUND

This relates generally to electronic devices, and more particularly, to electronic devices with displays.

Electronic devices often include displays. For example, cellular telephones and portable computers may have displays for presenting information to a user.

Liquid crystal displays contain a layer of liquid crystal material. Display pixels in a liquid crystal display contain thin-film transistors and electrodes for applying electric fields to the liquid crystal material. The strength of the electric field in a display pixel controls the polarization state of the liquid crystal material and thereby adjusts the brightness of the display pixel.

Substrate layers such as color filter layers and thin-film transistor layers are used in liquid crystal displays. A thin-film transistor layer contains an array of the thin-film transistors that are used in controlling electric fields in the liquid crystal layer. A color filter layer contains an array of color filter elements such as red, blue, and green elements. The color filter layer provides the display with the ability to display color images. In some displays the color filter elements are formed on the thin-film transistor layer.

A backlight unit is used to provide illumination for the display. The backlight unit includes light-emitting diodes that supply light to the edge of a light guide plate. The light guide plate laterally distributes light from the light-emitting diodes across the display. Scattering features in the light guide plate cause the light in the light guide plate to scatter outwardly through the layers of the display.

In color displays, the backlight illumination is white light that includes red, green, and blue components. In some displays, the light-emitting diodes that are used to provide light to the edge of the light-guide plate emit blue light. A quantum dot enhancement film is provided in the backlight to convert some of the blue light into red and green light.

Backlight units that include blue light-emitting diodes and quantum dot enhancement film can be subject to undesired blue edge effects where the peripheral edge of the backlight produces more blue light than red and green light. A display that is illuminated with this type of backlight unit will have an undesired blue color cast along its edges. The blue color cast can adversely affect the quality of images displayed on a display.

It would therefore be desirable to be able to provide improved backlights for displays such as liquid crystal displays.

SUMMARY

A display may have a color filter layer and a thin-film transistor layer. A liquid crystal layer may be located between the color filter layer and the thin-film transistor layer. Backlight structures may provide backlight illumination that passes through display layers in the display such as the color filter layer, thin-film transistor layer, and liquid crystal layer.

The backlight structures may have a light guide plate. Light-emitting diodes may emit blue light into an edge of the light guide plate. Optical films may overlap the light guide plate. The optical films may include a quantum dot enhancement film that converts some of the blue light into red and green light.

A strip of yellow reflector or other light control structures may be incorporated into the backlight structures to reduce blue edge effects. The material in the yellow reflector or other light control structures (e.g., yellow reflective material, quantum dot material, phosphorescent material, etc.) may absorb excess blue light at the edges of the display and may reflect or otherwise emit corresponding yellow(er) light (e.g., light that is less blue due to blue absorption by the light control structures and that may have red and green components). The light control structures may have features with a spatially varying density to reduce backlight illumination hot spots or dark areas. For example, a yellow reflector may have yellow dots with a density that decreases at increasing distances away from the edge of the light guide plate. If desired, the light control structures may be formed from peripheral strips of quantum dot enhancement film or other materials to enhance blue light conversion to red and green light near the edge of the display.

The light control structures may be formed on the surfaces of the optical films, on a reflective layer under the light guide plate, or on a surface of a mold frame or other structure that lies in a plane parallel to the plane of the light guide plate.

DETAILED DESCRIPTION

Electronic devices may include displays. The displays may be used to display images to a user. Illustrative electronic devices that may be provided with displays are shown in FIGS. 1, 2, 3, and 4.

Figure 1:
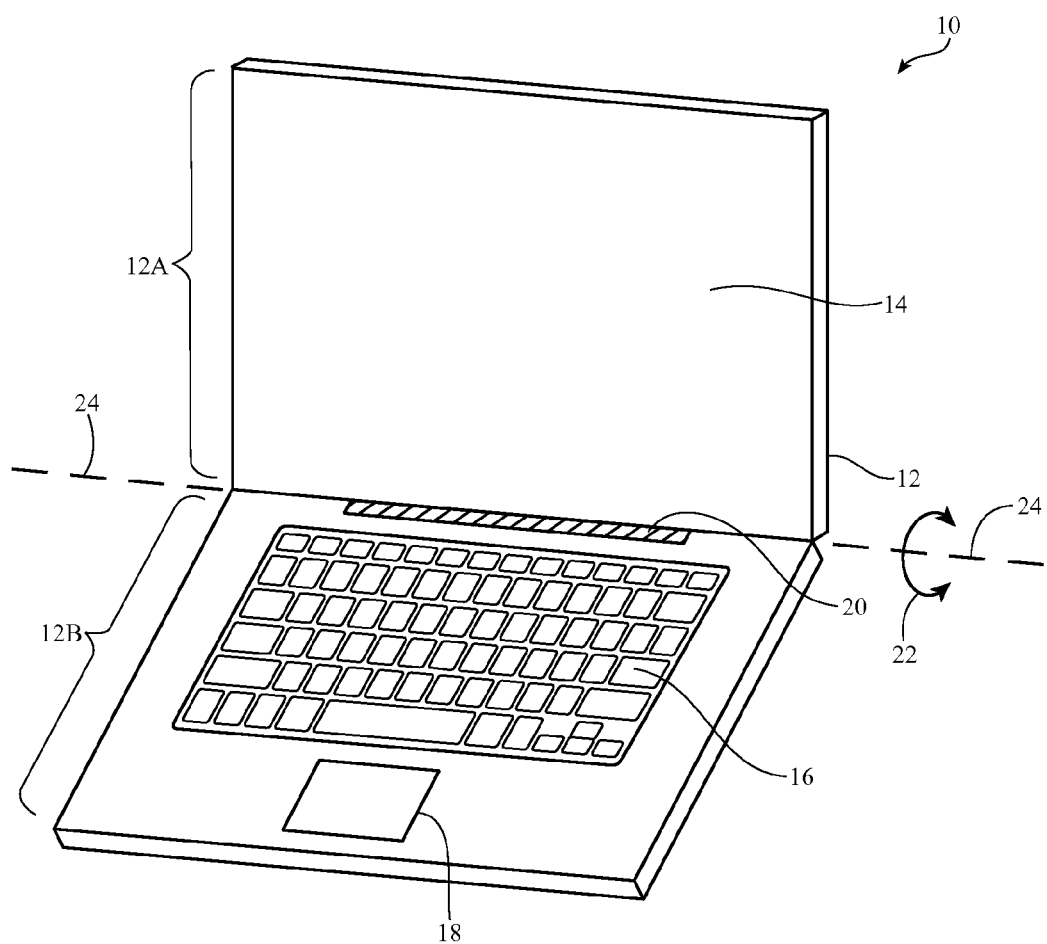
FIG. 1 is a perspective view of an illustrative electronic device such as a laptop computer with a display in accordance with an embodiment.

Illustrative electronic device 10 of FIG. 1 has the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes be referred to as a display housing or lid, may be placed in a closed position by rotating upper housing 12A towards lower housing 12B about rotational axis 24.

Figure 2:
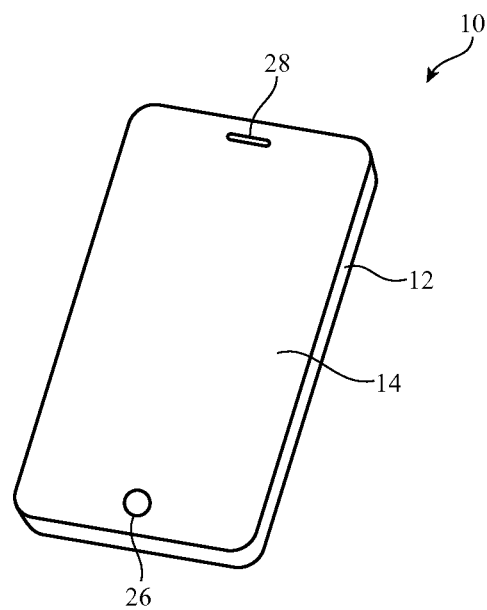
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
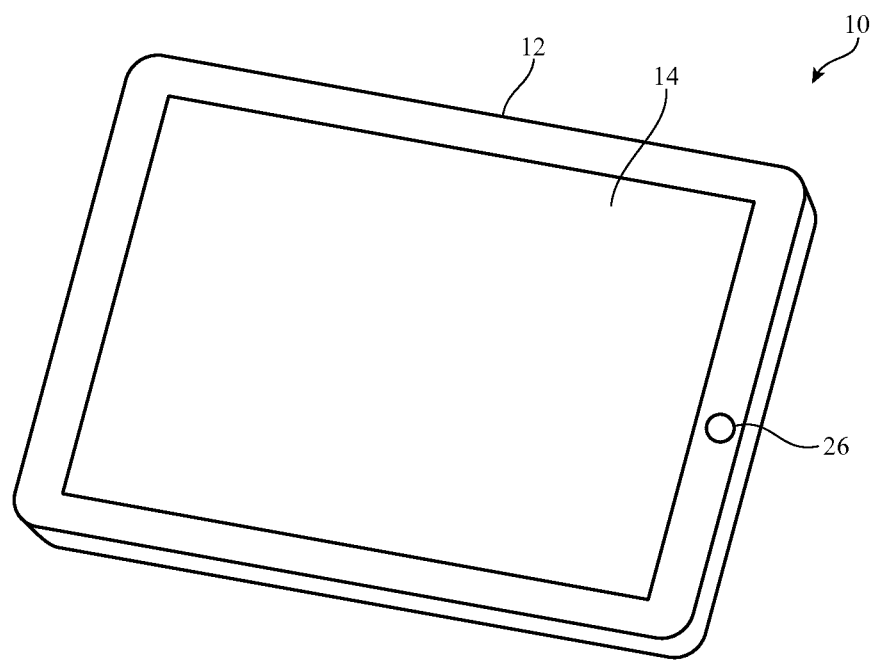
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
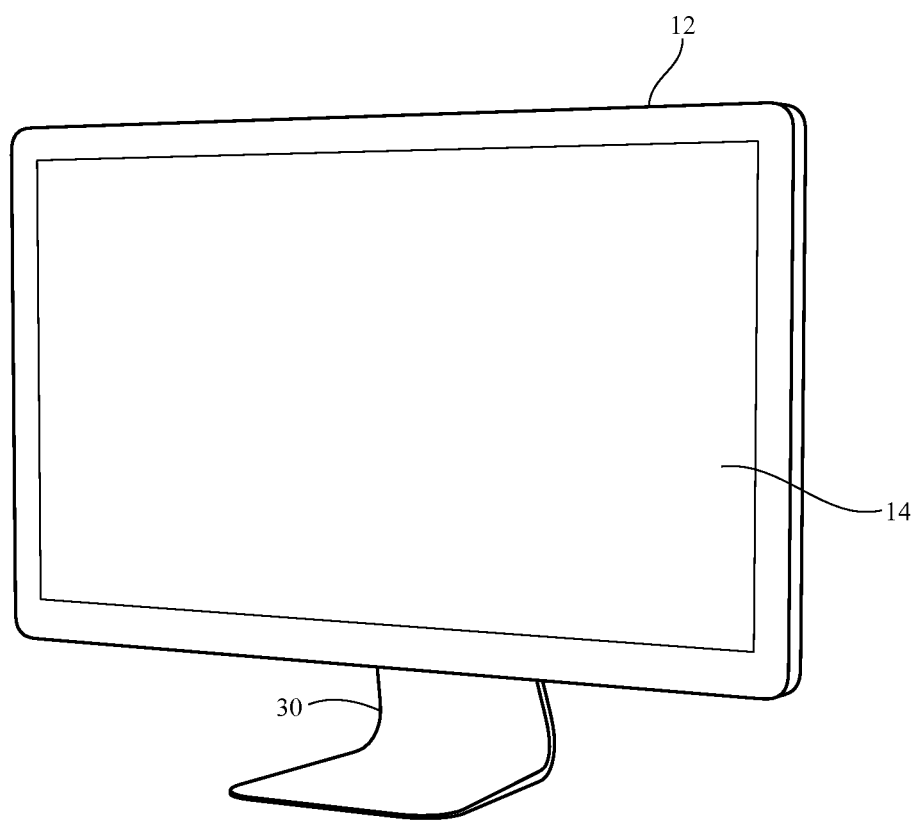
FIG. 4 is a perspective view of an illustrative electronic device such as a computer display with display structures in accordance with an embodiment.

FIG. 4 shows how electronic device 10 may be a computer display, a computer that has been integrated into a computer display, or a display for other electronic equipment. With this type of arrangement, housing 12 for device 10 may be mounted on a support structure such as stand 30 or stand 30 may be omitted (e.g., stand 30 can be omitted when mounting device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
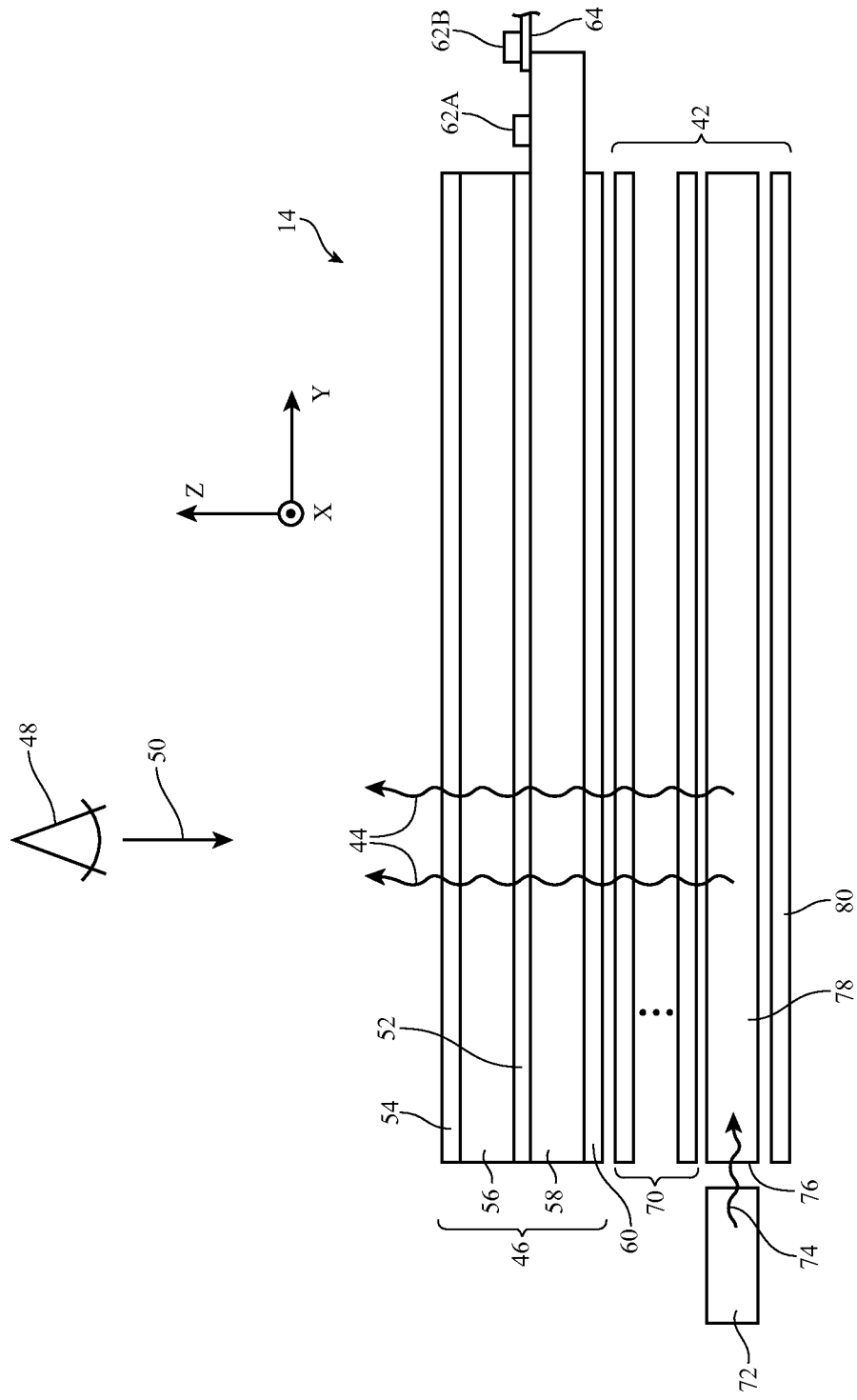
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, lower layer 58 may be a color filter layer and upper layer 56 may be a thin-film transistor layer. Another illustrative configuration involves forming color filter elements and thin-film transistor circuits with associated pixel electrodes on a common substrate. This common substrate may be the upper substrate or may be the lower substrate and may be used in conjunction with an opposing glass or plastic layer (e.g., a layer with or without any color filter elements, thin-film transistors, etc.) to contain liquid crystal layer 52. Illustrative configurations for display 14 in which layer 56 is a color filter layer and layer 58 is a thin-film transistor layer are sometimes described herein as an example.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes. If desired, light sources such as light source 72 may be located along multiple edges of light guide plate 78.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or humps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by a reflective film such as reflector 80. Reflector 80 may be formed from a reflective material such as a reflective layer of white plastic or other reflective materials.

To enhance backlight performance for backlight structures 42, backlight structures 42 may include optical films 70. Optical films 70 may include one or more diffuser layers for helping to homogenize backlight 44 and thereby reduce hotspots and one or more prism films (also sometimes referred to as turning films or brightness enhancement films) for collimating backlight 44. If desired, optical films 70 may include a quantum dot enhancement film. Compensation films for enhancing off-axis viewing may be included in optical films 70 or may be incorporated into other portions of display 14 (e.g., polarizer layers). Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
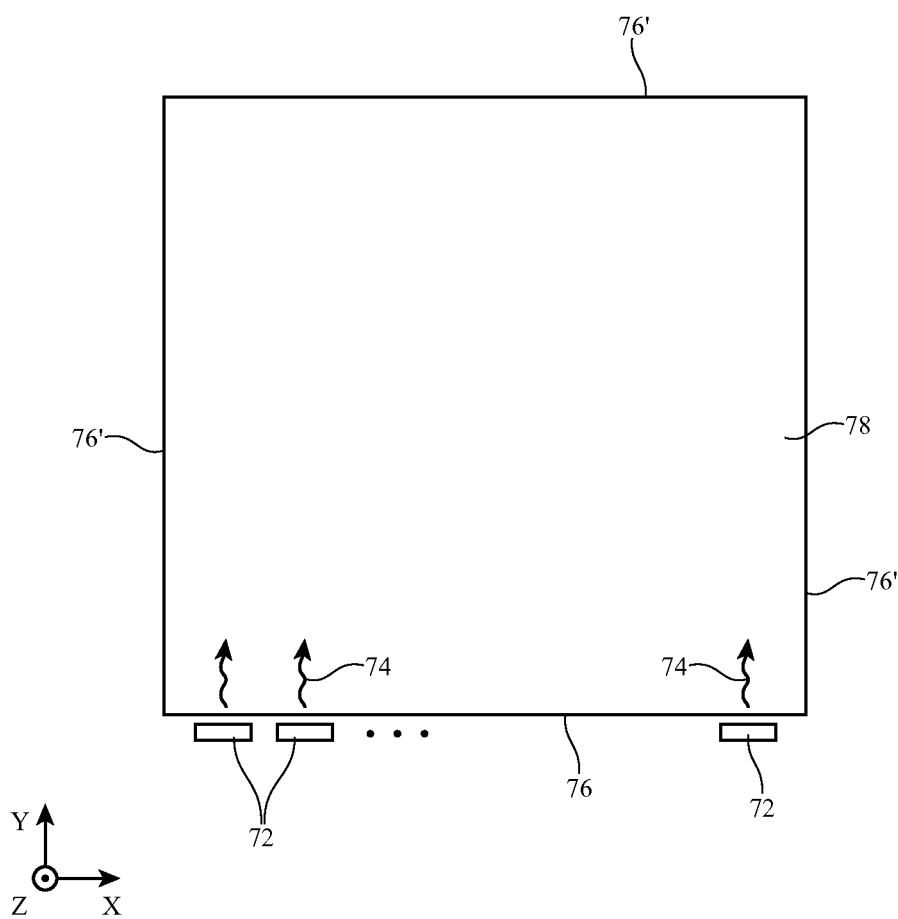
FIG. 6 is a top view of an illustrative light guide plate and array of light-emitting diodes for a backlight unit in accordance with an embodiment.

A top view of an illustrative rectangular light guide plate is shown in FIG. 6. As shown in FIG. 6, light-emitting diodes 72 may be arranged in an array along edge 76 of light-guide plate 78. Light-guide plate 78 may also have other peripheral edges such as edges 76'. If desired, light-emitting diodes 72 may provide light 74 for two or more peripheral edges of light guide plate 78. The configuration of FIG. 6 is shown as an example.

Figure 7:
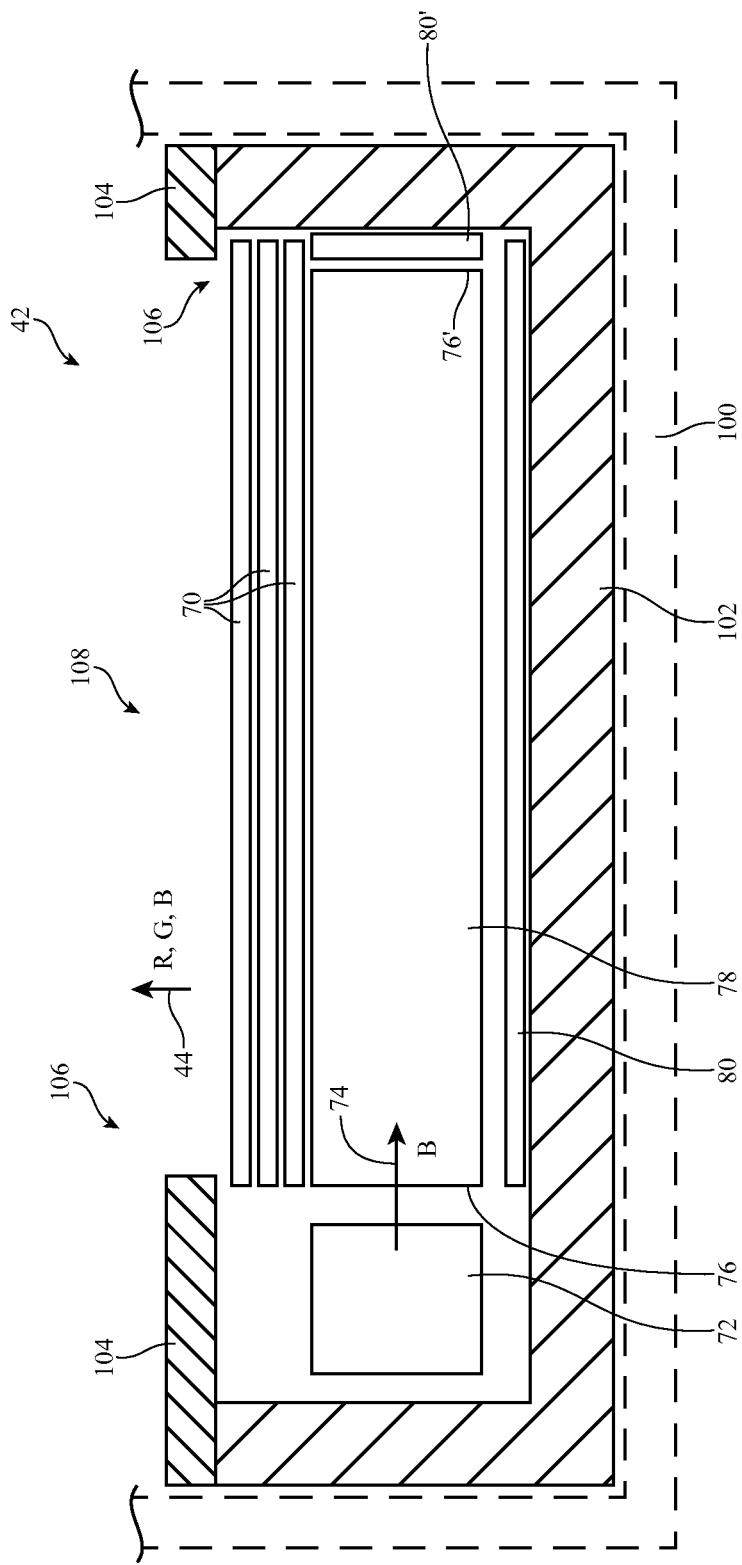
FIG. 7 is a cross-sectional side view of a portion of a display showing how the display may have a backlight unit with light-emitting diodes arranged along the edge of a light-guide plate that has been covered with optical films such as a quantum dot enhancement film in accordance with an embodiment.

A cross-sectional side view of illustrative backlight structures for display 14 is shown in FIG. 7. As shown in FIG. 7, backlight structures 42 may include optical films 70, light guide plate 78, and reflector (reflective layer) 80. Vertically extending edge reflector structures such as edge reflector 80' may be formed from white plastic, colored material, or other reflective material.

Optical films 70, light guide plate 78, and reflective layer 80 may be mounted in a chassis structure and/or may be mounted directly in housing 12. In the example of FIG. 7, films 70, light guide plate 78, and reflective layer 80 have been mounted in structure 102. Structure 104 may run around the peripheral edges of backlight structures 42. For example, structure 104 may extend along each of the four edges of a rectangular light guide plate. Portions of structure 104 may overlap portions of films 70, light guide plate 78 and/or reflective layer 80. Structures 104 and 102 may be formed as parts of an integral plastic or metal structure or may be separate structures. For example, structures 102 and 104 may be chassis structures in a backlight unit. If desired, structure 102 may be a metal chassis (sometimes referred to as an M-chassis) and structure 104 may be a plastic chassis (sometimes referred to as a P-chassis or mold frame). Structures 102 and 104 may also be formed from other materials such as glass, ceramic, fiber-based composites, other materials, or combinations of these materials, plastic(s), metal(s), and/or other suitable backlight structure supporting members. Structures 102 and 104 may be mounted in additional structures such as structure 100 (e.g., part of housing 12, metal, glass, plastic, ceramic, fiber-based composite material, other materials, or combinations of these materials). Configurations in which structure 102 is a chassis structure and structure 104 is a mold frame are sometimes described herein as an example. In general, structures such a structures 100, 102, and 104 and/or additional support structures for backlight structures 42 may be formed from plastic, metal, other materials, combinations of these materials, a single integral part, two separate parts, or three or more separate parts. The configuration of FIG. 7 is merely illustrative.

Light-emitting diodes such as diode 72 may emit blue (B) light 74 into edge 76 of light guide plate 78. Blue light 74 may be conveyed throughout light guide plate 78 due to the principal of total internal reflection. One of films 70 (e.g., the innermost film 70 in FIG. 7) may be a quantum dot enhancement film. The quantum dot film may be a single-layer of quantum dot material or may include two or more sublayers (e.g., the quantum dot film may be formed from a stack of quantum dot films each with a different type of quantum dots and therefore a correspondingly different fluorescence spectrum). The films above the quantum dot enhancement film may be, for example, one, two, or more than two prism films, and one or more optional diffuser layers (as examples). Configurations in which films 70 include a lowermost layer that is a quantum dot enhancement film and two overlapping prism film layers are sometimes described herein as an example. Other configurations for backlight structures 42 and films 70 may be used, if desired.

The quantum dot enhancement film (i.e., the lowermost optical film in stack 70), may be formed from a polymer or other material that contains quantum dots. The quantum dots may be formed from semiconductor particles such as CdSe particles. When blue light travels through the quantum dot enhancement film, the quantum dots in the quantum dot enhancement film absorb some of the blue light and luminesce at red and green wavelengths. As a result, blue light B is converted into red, green, and blue light (R, G, B) for backlight 44. The red, green, and blue color peaks in the spectrum of backlight 44 may be relatively narrow and may be spectrally aligned with the filter pass bands of the color filter elements in color filter layer 56. The use of the quantum dot enhancement film may therefore be used to help ensure that display 14 has the ability to efficiently reproduce colors with a wide color gamut.

Backlight units such as backlight unit 42 of FIG. 7 that incorporate quantum dot enhancement films may be prone to undesired blue color casts along their edges. The blue color cast along the edge of a backlight results from emission of excessive blue light relative to red and green light from the quantum dot film. The blue color cast may appear along edge portions of backlight structures 42 such as edges 106, whereas central region 108 may exhibit appropriately balanced amounts of blue, green, and red light. Blue edges may be caused by light leakage of blue light B along edges 106, ingress of oxygen and/or moisture into the edge of the quantum dot enhancement film in layers 70 that degrades the quantum dots and therefore decreases blue to red and blue to green light conversion efficiencies, preferential leakage of red and green light relative to blue light along light guide plate edges 76 and 76' due to imperfect edge surfaces (i.e., surface roughness along edge surfaces 76 and 76'), and reduced blue light recycling (reduced passes of blue light) through the quantum dot enhancement film along edges 106 relative to central portion 108.

Blue edge effects can be reduced or eliminated by incorporating light control structures into backlight structures 42 that block light and/or that reflect light. The light control structures may include reflective layers, reflective coatings, reflective portions of a mold frame or other backlight unit support structure, additional quantum dot enhancement film layers, and other structures. The light control structures may exhibit wavelength-dependent reflectivity. For example, a light control structure for backlight structures 42 may be formed from yellow structures such as peripheral strips of yellow plastic to absorb blue light. Light control structures with other spectral responses may also be used.

In some situations, light control structures such as reflective layers may have spatially uniform optical properties. For example, reflectance may be constant across the width of a reflector layer. In other situations, the light control structures may have gradually varying optical properties. For example, the spectrum of reflected light and/or the amount of reflected light from a light control structure may vary as a function of distance across the surface of the light control structure. Reflectors or other structures that have spatially varying reflectivities may be used to smooth transitions within backlight structures 42 (e.g., to minimize hotspots or dark spots within backlight 44).

Figure 8:
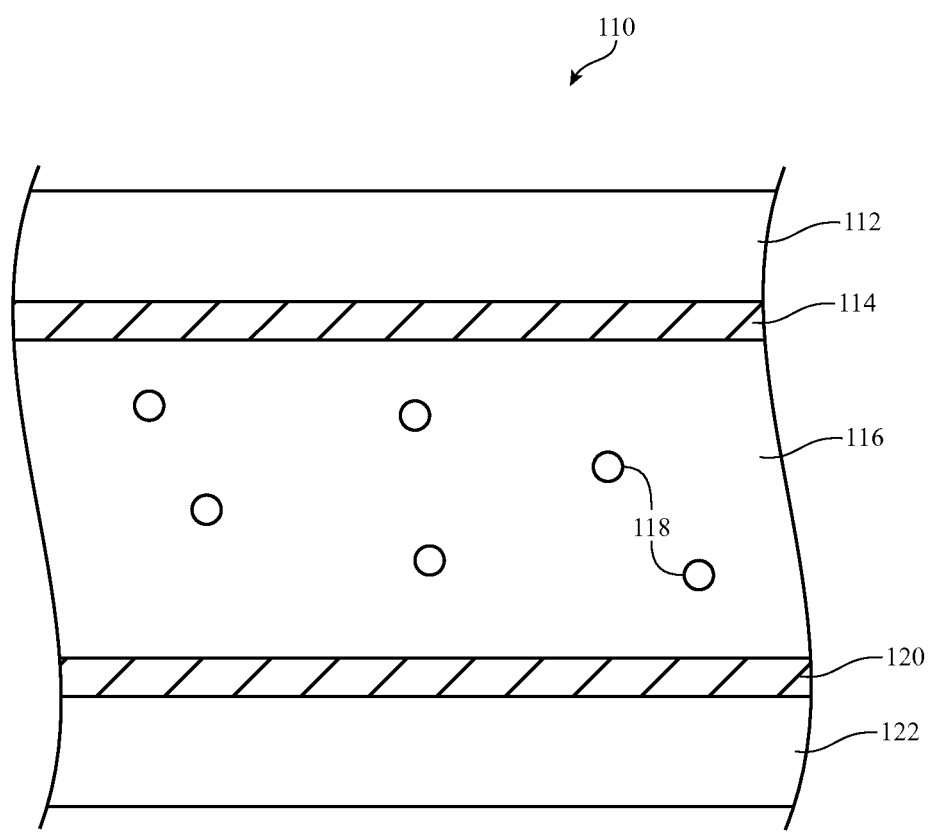
FIG. 8 is a cross-sectional side view of a portion of an illustrative quantum dot enhancement film in accordance with an embodiment.

Optical films 70 may include a quantum dot enhancement film formed from one or more sublayers of quantum dot film material. The light control structures that are incorporated into backlight unit 42 may also include quantum dot structures such as quantum dot enhancement film. A cross-sectional side view of an illustrative quantum dot enhancement film is shown in FIG. 8. As shown in FIG. 8, quantum dot enhancement film 110 may be formed from multiple layers of material. Quantum dot enhancement film 110 may, for example, include one or more polymer carrier layers such as upper polymer layer 112 and lower polymer layer 122. Layers 112 and 122 may be substrate layers formed from materials such as polyethyleneterephthalate (PET), other polyesters, or other flexible polymer layers. Polymer resin 116 may be sandwiched between polymer layers 112 and 122. Quantum dots 118 may be embedded within polymer 116. Quantum dots 118 may be formed from semiconductor particles (e.g., particles of cadmium selenide or other semiconductors) or other materials. To prevent degradation of quantum dots 118 from environmental exposure (e.g., moisture and/or oxygen), moisture barrier layers such as moisture barrier layers 114 and 120 may be incorporated into quantum dot enhancement film 110. For example, moisture barrier 114 may be interposed between polymer layer 112 and quantum dot polymer layer 116 and moisture barrier 120 may be interposed between polymer layer 122 and quantum dot polymer layer 116. Moisture barrier films 114 and 120 may be formed from multiple layers of moisture blocking materials (e.g., layers of inorganic material).

Figure 9:
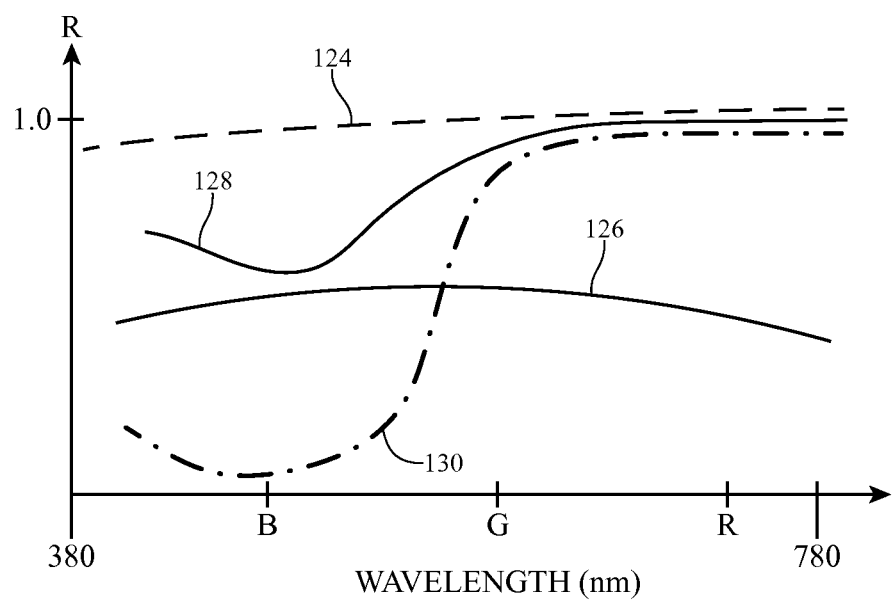
FIG. 9 is a graph showing how reflective structures in a backlight may be provided with different spectral profiles in accordance with an embodiment.

FIG. 9 is a graph of illustrative reflection spectrums that may be exhibited by light control structures in backlight unit 42 (e.g., reflective materials). In the graph of FIG. 9, reflectivity R has been plotted as a function of wavelength over a visible wavelength range extending from 380 nm (violet) to 780 nm (red). Curve 124 corresponds to a material such as silver or other metal that is highly reflective and does not exhibit significant spectral variations across the visible spectrum. Curve 126 corresponds to another material that is relatively wavelength insensitive such as gray plastic. Curve 128 corresponds to a material that reflects red and green light more than blue light. This type of material will have a yellow appearance and is therefore sometimes referred to as a yellow reflector or yellow reflective material. Examples of yellow reflectors include yellow plastic layers, layers of plastic that have been coated with yellow paint (e.g., yellow dye or pigment in a liquid polymer binder), and molded yellow plastic that has been injection molded into a mold frame or other plastic part using one of two shots in a two shot molding process. Curve 130 is similar to curve 128 but exhibits less blue light reflectivity (i.e., curve 130 corresponds to a light control structure that has been coated with more yellow material that the structure associated with curve 128).

Figure 10:
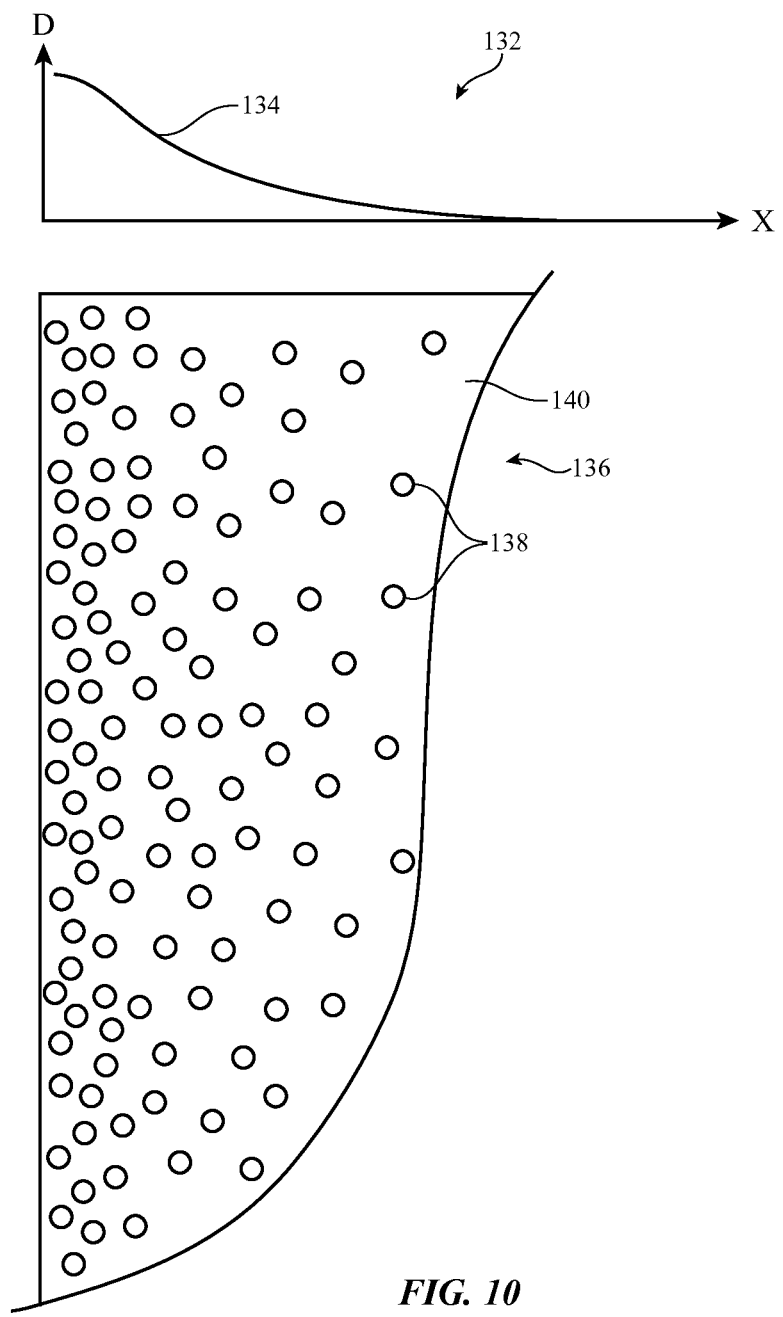
FIG. 10 is a diagram showing how a reflective structure may be formed with reflective dots with a graded density or other spatially varying reflecting surfaces in accordance with an embodiment.

FIG. 10 is a diagram showing how a light control structure such as a yellow reflector or other reflector may have a pattern of dots or other surface treatment (pattern, coating depth, paint color, substrate color and/or texture, etc.) that varies as a function of lateral distance X across the surface of the light control structure. In graph 132, curve 134 represents the density D of the surface treatment that has been applied to illustrative reflector 136.

In the example of FIG. 10, reflector 136 has been coated with dots 138 on substrate 140. Reflector substrate 140 may be a layer of grey plastic, white plastic, or other substrate. Dots 138 may be yellow dots formed from yellow paint or other material. Dots 138 may be formed using ink-jet printing, screen printing, pad printing, or other deposition and patterning techniques. The density D of dots 138 decreases as a function of increasing distance X across the surface of reflector 136. As a result, reflector 136 will exhibit a reflectivity that is both spectrally varying (e.g., blue light will be reflected less than red and green light) and spatially varying (i.e., the wavelength selectivity of reflector 136 will be greater at low values of X where yellow dot density D is highest and will be lower at high values of X where yellow dot density D is lowest). The use of spatially graded reflectors and other light control structures that reflect light differently as a function of distance X across their width may be used to avoid hotspots and dark spots in backlight 44.

Figure 11:
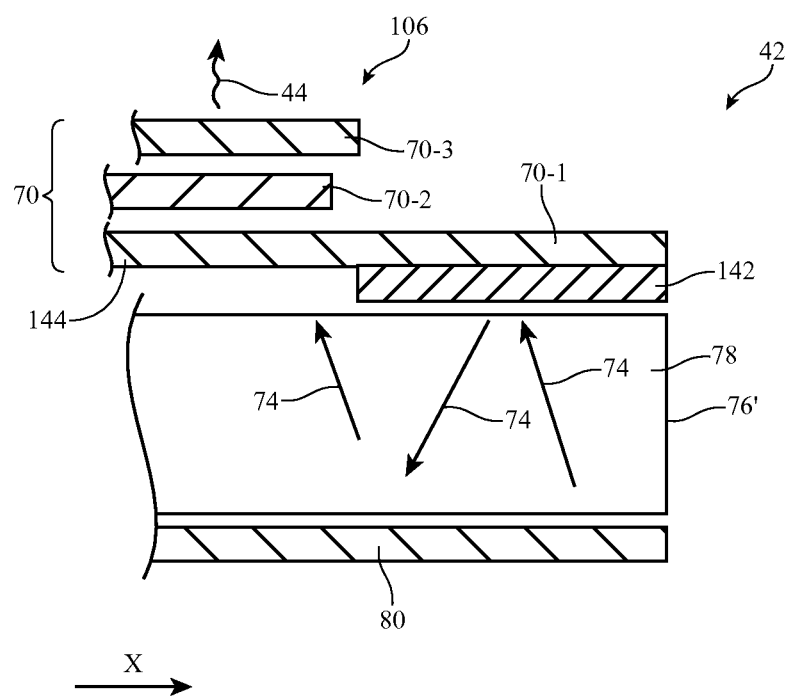
FIG. 11 is a cross-sectional side view of a portion of a display in which a reflective structure has been interposed under a peripheral portion of an optical film in a backlight to help reduce blue edge effects in accordance with an embodiment.

Light control structures for reducing blue edge effects may be incorporated above or below light guide plate 78 and/or may be incorporated into other portions of backlight structures 42. In the example of FIG. 11, light control structure 142 has been formed on lower (inner) surface 144 of optical film layer 70-1. Optical films 70 may include layers such as layer 70-1, 70-2, and 70-3. Light control structure 142 may be formed as a coating on surface 144 of layer 70-1 in a peripheral portion of layer 70-1 running along the edges of the light guide plate or may be formed by attaching a strip-shaped plastic layer or other substrate for structure 142 to peripheral portions of surface 144 using adhesive. Layer 70-1 may be a quantum dot enhancement film. Layers 70-2 and 70-3 may be prism films (and/or additional layers such as diffuser layers, etc.). Light control structure 142 may be a yellow reflector, may be a spatially varying (graded density) yellow reflector, may have a reflectivity that is spatially invariant, may have a reflectivity that is graded, may have a non-yellow color, or may have other spectral properties and/or spatial variations. The presence of light control structure 142 may help reduce blue light at edge 106. For example, a yellow reflective surface of light control structure 142 may absorb blue light relative to red and green light around the periphery of backlight structures 42, so that edge 106 of backlight structures 42 emits backlight that is less blue. The use of a graded reflector (i.e., a reflector having a reflectivity that decreases as distance along dimension −X is increased) may help avoid creating hotspots or dark spots in light 44.

Figure 12:
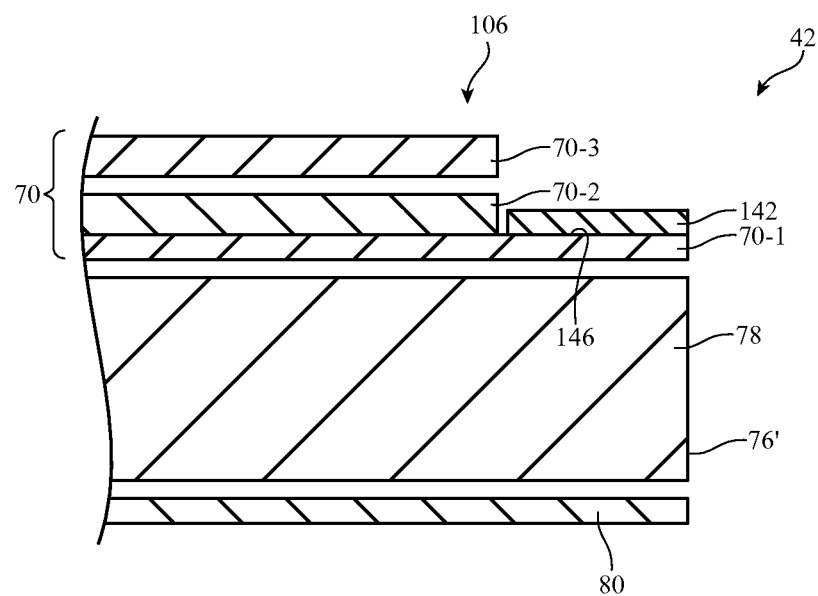
FIG. 12 is a cross-sectional side view of a portion of a display in which a reflective structure has been formed above a peripheral portion of an optical film in a backlight to help reduce blue edge effects in accordance with an embodiment.

In the example of FIG. 12, light control structure 142 has been formed on outer (upper) surface 146 of layer 70-1 (e.g., on the top layer of a quantum dot enhancement film) in a strip extending along one or more peripheral edge regions of backlight structures 42. Light control structure 142 may be formed from yellow paint or other coating material that is deposited and patterned on surface 146, may be formed from yellow plastic or plastic with yellow paint that has been mounted on surface 146, or may be formed from other structures. Light control structure 142 may be graded. For example, light control structure 142 may have a pattern of yellow dots that decreases in density at increasing distances into structures 42 from each edge 76' of light guide plate 78.

Figure 13:
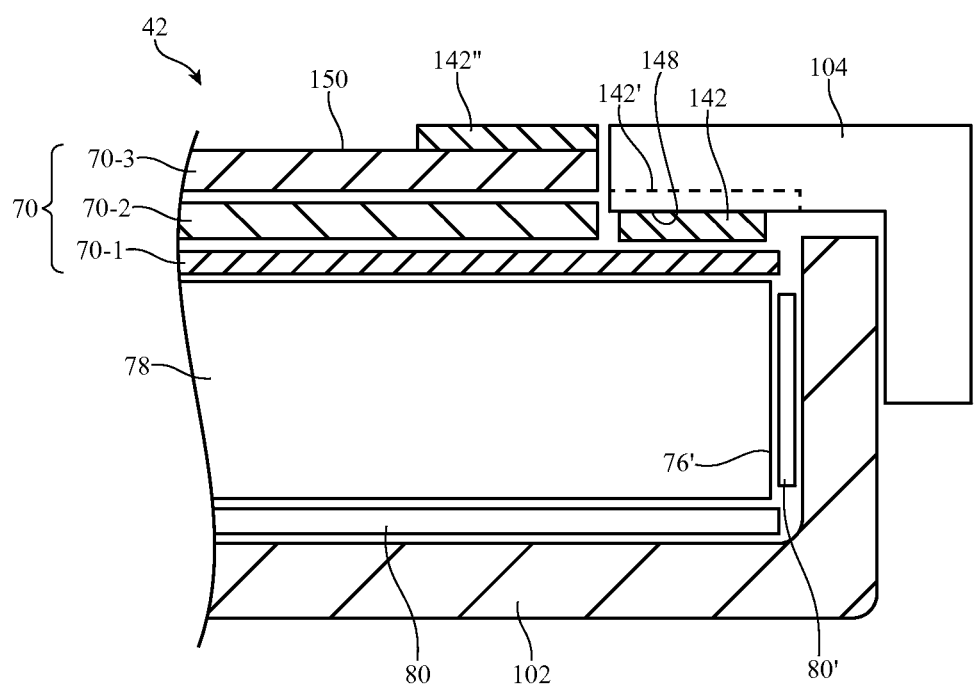
FIG. 13 is a cross-sectional side view of a portion of a display in which a reflective structure has been formed under a peripheral structure such as a mold frame that overlaps the edge of an optical film in a backlight to help reduce blue edge effects in accordance with an embodiment.

Another illustrative arrangement for mounting light control structures 142 in backlight structures 42 is shown in FIG. 13. In the example of FIG. 13, mold frame 104 has a lower surface such as surface 148 that overlaps the edge of light guide plate 78 and that lies in a plane that is parallel to the plane of light guide plate 78. Light control structure 142 can be formed on surface 148. Light control structure 142 may be formed from yellow paint or other yellow coating layer on surface 148, may be formed from a plastic substrate (e.g., a strip-shaped yellow plastic sheet or a strip of plastic that has been coated with yellow paint) that is mounted on surface 148, or may be formed from other reflective structures.

If desired, mold frame 104 may be formed from multiple shots of injection molded plastic. In this scenario, light control structure 142 may be formed as one of the shots of plastic (see, e.g., plastic shot 142' in FIG. 13). The shot of plastic used in forming structure 142 may be, for example, yellow plastic. Light control structure 142 of FIG. 13 may be mounted above layer 70-1 (e.g., a quantum dot enhancement film). Layers 70-2 and 70-3 (e.g., prism films and/or additional films) may have outer edges that are laterally adjacent to structures 104.

If desired, additional light control structures such as light control structure 142" may be incorporated into the edge of backlight structures 42 to reduce blue edge effects. Additional light control structure 142" may be formed on outer surface 150 of layer 70-3. Light control structure 142" may be yellow paint or other yellow coating on surface 150, may be formed from a yellow reflector mounted to surface 150 that is formed from a yellow plastic substrate or a plastic substrate coated with yellow paint, or may be other reflective layer(s).

Light control structures 142 and/or 142" may be spatially invariant or may be graded (e.g., structures 142 and/or 142" may have yellow dot densities or other reflective properties that vary as a function of position across their width).

Figure 14:
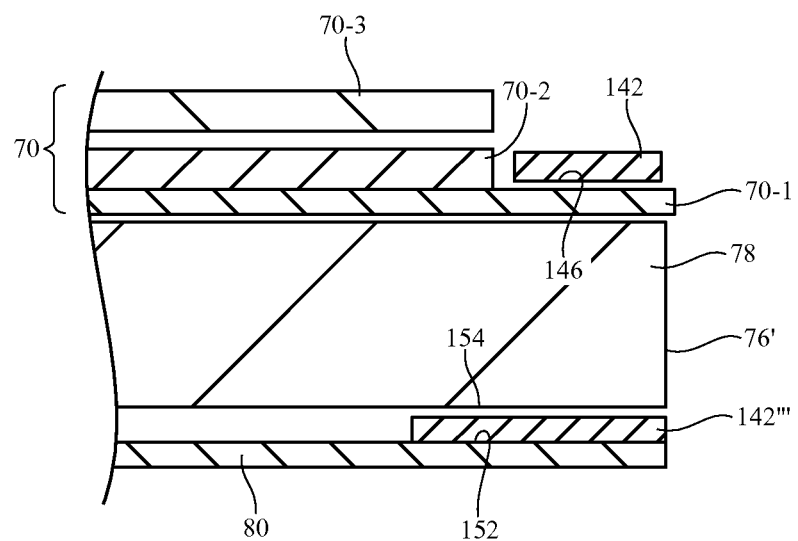
FIG. 14 is a cross-sectional side view of a portion of a display in which reflective structures have been formed above a peripheral portion of an optical film and below a light-guide plate in a backlight to help reduce blue edge effects in accordance with an embodiment.

As shown in FIG. 14, light control structures 142''' may be formed on reflector 80 under a peripheral portion of light guide plate 78. Light control structures 142''' may be formed from yellow paint or other yellow coating layer on surface 152 of reflector 80, may be formed from a yellow plastic strip or yellow-coated plastic strip that is mounted to peripheral portion of surface 152, or may be formed from other reflective structures on surface 152. Light control structures 142" may be provided in a backlight unit such as backlight unit 42 of FIG. 14 that also includes light control structure 142 on surface 146 of layer 70-1 (e.g., the surface of a quantum dot enhancement film) or that includes light control structures such as light control structure 142 or 142' of FIG. 13 or light control structure 142 of FIG. 11.

Light control structures 142 may be formed in a strip that runs along some or all of the peripheral edges of backlight unit 42 (e.g., a strip in a peripheral region that extends along edges 76' and, if desired edge 76 of light guide plate 78, etc.). In some configurations, one or more of the light control structures in backlight structures 42 may be formed from quantum dot enhancement film. For example, light control structures 142''' of FIG. 14 and/or a light control structure interposed between structures 142 and layer 70-1 of FIG. 14 may be formed from quantum dot enhancement film. The incorporation of additional quantum dot enhancement film at the edges of backlight structures 42 enhances the conversion of blue light B into red light R and green light G for backlight 44 and helps to reduce blue edge effects.

Figure 15:
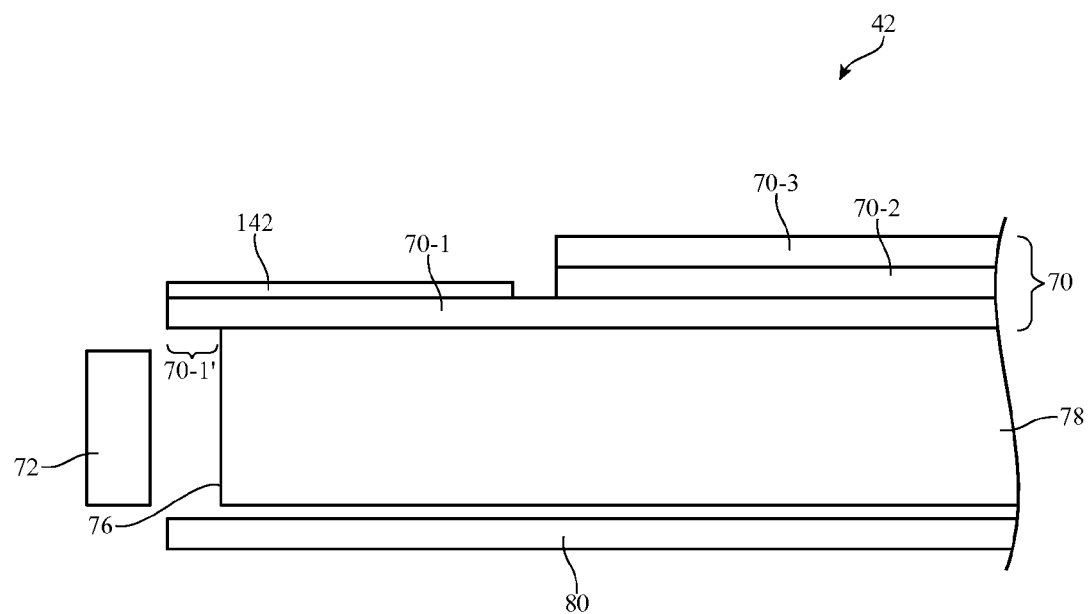
FIG. 15 is a cross-sectional side view of a portion of a display in which layers in a backlight unit have been laterally extended to help reduce blue edge effects in accordance with an embodiment.

FIG. 15 is a cross-sectional side view of a portion of backlight structures 42 in an illustrative configuration in which layer 70-1 and light control structure 142 (e.g., a peripheral reflector such as a yellow reflector, etc.) have been extended past edge 76 of light guide plate 78 towards light-emitting diode 72 and in which reflector 80 has been extended past edge 76 towards light-emitting diode 72. This arrangement tends to enhance the conversion of blue light to red and green light (e.g., due to the presence of additional quantum dot enhancement film portion 70-1' extending over edge 76 of light guide plate 78 towards the array of light-emitting diodes 72) and thereby helps to reduce blue edge effects. If desired, vertically extending reflectors in backlight structures 42 such as reflector 80' of FIG. 7 may be formed from yellow material to help further reduce blue edge effects.

Figure 16:
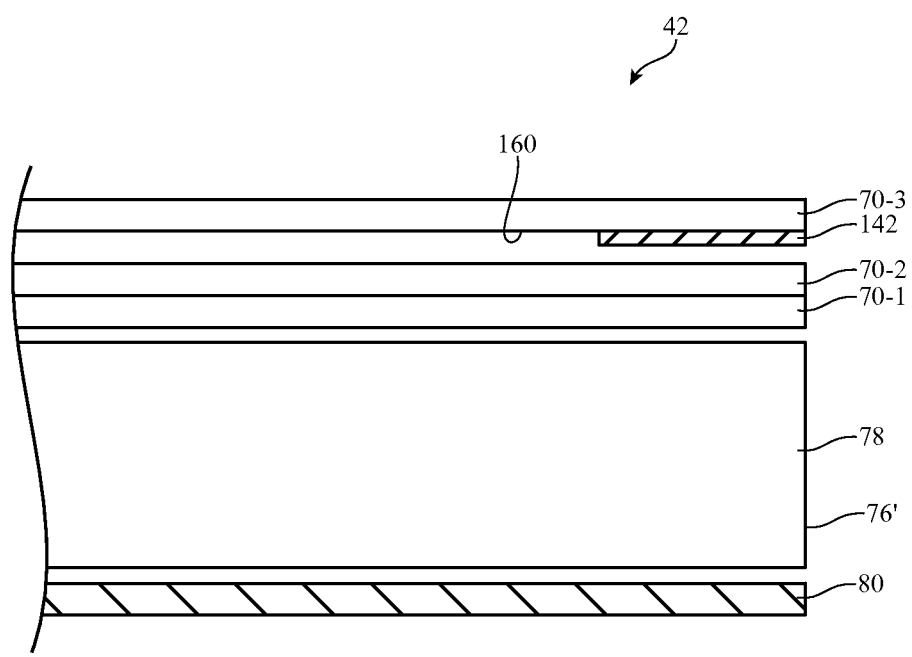
FIG. 16 is a cross-sectional side view of a portion of a display in which a reflective structure has been formed on the underside of an optical film in a stack of optical films that overlap a light guide plate in a backlight to help reduce blue edge effects in accordance with an embodiment.

FIG. 16 is a cross-sectional side view of a portion of a display in which a light control structure has been formed on an optical film in a stack of optical films that overlap light guide plate 78 in backlight 42 to help reduce blue edge effects. Optical films 70 may include layers such as layers 70-1, 70-2, and 70-3. Light control structure 142 may be formed on the upper and/or lower surface of one, two, or three or more of layers 70-1, 70-2, and 70-3. The optical film in layers 70 on which light control structure 142 is formed may be the uppermost of two layers 70, may be the uppermost of three layers 70 (as shown in FIG. 16) or may be any other layer in layers 70.

In the example of FIG. 16, light control structure 142 has been formed on lower (inner) surface 160 of optical film layer 70-3. Light control structure 142 may be formed as a coating on surface 160 of layer 70-3 in a peripheral portion of layer 70-3 running along the edges of light guide plate 78 or may be formed by attaching a strip-shaped plastic layer or other substrate for structure 142 to peripheral portions of surface 160 using adhesive.

Layers 70-1, 70-2, and 70-3 of optical films 70 of FIG. 16 may be prism films, diffuser layers, compensation films, quantum dot enhancement film, or other suitable optical films. For example, layer 70-1 may be a quantum dot enhancement film and layers 70-2 and 70-3 may be prism films or layer 70-1 may be a quantum dot enhancement film and layers 70-2 and 70-3 may include a prism film and a diffuser film.

Light control structure 142 of FIG. 16 may be a yellow reflector, may be a spatially varying (graded density) yellow reflector, may have a reflectivity that is spatially invariant, may have a reflectivity that is graded, may have a non-yellow color, or may have other spectral properties and/or spatial variations. The presence of light control structure 142 may help reduce blue light at the edges of display 14. For example, a yellow reflective surface of light control structure 142 may absorb blue light relative to red and green light around the periphery of backlight structures 42, so that the edge of backlight structures 42 emits backlight that is less blue. The use of a graded reflector may help avoid creating hotspots or dark spots in light 44.

In general, the light control structures that are incorporated into backlight 42 such as light control structure 142 of FIG. 11, light control structure 142 of FIG. 12, light control structures such as light control structures 142, 142', and 142" of FIG. 13, light control structures 142 and 142''' of FIG. 14, light control structure 142 of FIG. 15, light control structure 142 of FIG. 16, and/or other suitable light control structures in backlight 42 may be formed from yellow reflectors or reflectors characterized by other reflection spectrums. If desired, other structures in backlight 42 may be used to reduce blue edge effects. For example, edge reflectors in backlight 42 (e.g., edge reflector 80' of FIGS. 7 and 13, which runs vertically, perpendicular to the plane of light guide plate 78) may be formed from yellow reflectors or reflectors characterized by other reflection spectrums to reduce blue edge effects. Quantum dot enhancement film may be used in forming some or all of light control structure 142 of FIG. 11, light control structure 142 of FIG. 12, light control structures such as light control structures 142, 142', and 142" of FIG. 13, light control structures 142 and 142''' of FIG. 14, light control structure 142 of FIG. 15, light control structure 142 of FIG. 16, and/or other suitable light control structures in backlight 42, and/or edge reflectors 80', and/or a portion or all of the area of reflective layer 80. The quantum dot enhancement film may include one or more sublayers of quantum dot material. Self-emitting structures and/or material that emits light when stimulated by applied light (e.g., yellow light-emitting diodes, light-emitting diodes of other colors, or other light sources, phosphorescent materials, etc.) can also be used in forming some or all of light control structure 142 of FIG. 11, light control structure 142 of FIG. 12, light control structures such as light control structures 142, 142', and 142" of FIG. 13, light control structures 142 and 142''' of FIG. 14, light control structure 142 of FIG. 15, light control structure 142 of FIG. 16, and/or other suitable light control structures in backlight 42, and/or edge reflectors 80', and/or a portion or all of the area of reflective layer 80.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
    display layers including a layer of liquid crystal material; and
    backlight structures that supply backlight that passes through the display layers, wherein the backlight structures include:
        a rectangular light guide plate having edges;
        a reflective layer under the rectangular light guide plate;
        an array of blue light-emitting diodes that emit blue light into at least one edge of the light guide plate;
        a quantum dot enhancement film on top of the light guide plate that converts the blue light into red and green light, wherein the red and green light and some of the blue light form the backlight that passes through the display layers; and
        a light control structure that reduces blue edge effects in the display, wherein the light control structure comprises a reflector in a peripheral region of the backlight structures, wherein the reflector is a yellow reflector that absorbs some of the blue light, and wherein the yellow reflector has a spatially varying density of yellow material.

2. The display defined in claim 1 wherein the spatially varying density of yellow material is formed by a spatially varying density of yellow dots.

3. The display defined in claim 1 wherein the quantum dot enhancement film has opposing inner and outer surfaces and wherein the reflector is formed on a peripheral portion of the outer surface.

4. The display defined in claim 3, the backlight structures further comprising:
    at least one optical film over the outer surface of the quantum dot enhancement film, wherein the quantum dot enhancement film is interposed between the at least one optical film and the rectangular light guide plate, wherein the reflector is formed on the peripheral portion of the outer surface of the quantum dot enhancement film without overlapping the at least one optical film, and wherein the quantum dot enhancement film is interposed between the reflector and the rectangular light guide plate.

5. A display, comprising:
   display layers including a layer of liquid crystal material; and
   backlight structures that supply backlight that passes through the display layers, wherein the backlight structures include:
   a rectangular light guide plate having edges;
   a reflective layer under the rectangular light guide plate;
   an array of blue light-emitting diodes that emit blue light into at least one edge of the light guide plate;
   a quantum dot enhancement film on top of the light guide plate that converts the blue light into red and green light, wherein the red and green light and some of the blue light form the backlight that passes through the display layers; and
   a light control structure that reduces blue edge effects in the display, wherein the light control structure comprises a reflector in a peripheral region of the backlight structures, wherein the quantum dot enhancement film has opposing inner and outer surfaces, and wherein the reflector is formed on a peripheral portion of the inner surface.

6. The display defined in claim 5 wherein the reflector comprises a yellow reflector.

7. The display defined in claim 1 wherein the backlight structures further comprise a support structure overlapping a peripheral edge portion of the quantum dot enhancement film and wherein the reflector is formed on a surface of the support structure.

8. The display defined in claim 7 wherein the support structure is a mold frame.

9. The display defined in claim 1 wherein the backlight structures further comprise at least one optical film over the quantum dot enhancement film and wherein the reflector is formed on the optical film.

10. The display defined in claim 9 wherein the optical film comprises a prism film.

11. A display, comprising:
    display layers including a layer of liquid crystal material; and
    backlight structures that supply backlight that passes through the display layers, wherein the backlight structures include:
    a rectangular light guide plate having edges;
    a reflective layer under the rectangular light guide plate;
    an array of blue light-emitting diodes that emit blue light into at least one edge of the light guide plate;
    a quantum dot enhancement film on top of the light guide plate that converts the blue light into red and green light, wherein the red and green light and some of the blue light form the backlight that passes through the display layers; and
    a light control structure that reduces blue edge effects in the display, wherein the light control structure comprises a reflector in a peripheral region of the backlight structures, wherein the backlight structures further comprise at least one optical film over the quantum dot enhancement film, wherein the reflector is formed on the optical film, wherein the optical film has an outer surface and an opposing inner surface, and wherein the reflector is formed on the inner surface.

12. The display defined in claim 9 further comprising an additional optical film interposed between the reflector and the quantum dot enhancement film.

13. The display defined in claim 12 wherein at least one of the optical film and the additional optical film comprises a prism film.

14. A display, comprising:
    display layers including a layer of liquid crystal material; and
    backlight structures that supply backlight that passes through the display layers, wherein the backlight structures include:
    a rectangular light guide plate having edges;
    a reflective layer under the rectangular light guide plate;
    an array of blue light-emitting diodes that emit blue light into at least one edge of the light guide plate;
    a quantum dot enhancement film on top of the light guide plate that converts the blue light into red and green light, wherein the red and green light and some of the blue light form the backlight that passes through the display layers; and
    a light control structure that reduces blue edge effects in the display, wherein the light control structure comprises a reflector in a peripheral region of the backlight structures, and wherein the reflector is formed on a surface of the reflective layer and is interposed between the reflective layer and the light guide plate.

15. The display defined in claim 14 wherein the reflector comprises a yellow reflector and wherein the reflective layer comprises a sheet of white plastic.

16. The display defined in claim 15 wherein the array of blue light-emitting diodes emit the blue light into a given one of the edges of the light-guide plate and wherein a portion of the quantum dot enhancement film extends over the give edge of the light guide plate towards the light-emitting diodes.

17. The display defined in claim 14, the backlight structures further comprising:
    an additional light control structure that reduces blue edge effects in the display, wherein the additional light control structure comprises an additional reflector in the peripheral region of the backlight structures, wherein the additional reflector is formed on a surface of the quantum dot enhancement film, and wherein the quantum dot enhancement film is interposed between the additional reflector and the rectangular light guide plate.

18. The display defined in claim 5, wherein the reflector is interposed between the quantum dot enhancement film and the rectangular light guide plate.

19. The display defined in claim 11, wherein the quantum dot enhancement film is interposed between the optical film and the rectangular light guide plate, and wherein the reflector is interposed between the quantum dot enhancement film and the optical film.

* * * * *